3,395,024
METHOD OF PRESERVING FOODS BY COATING SAME
Roland D. Earle, 749 N. Southlake Drive,
Hollywood, Fla. 33020
No Drawing. Continuation-in-part of application Ser. No. 370,335, May 26, 1964. This application May 17, 1965, Ser. No. 456,482
9 Claims. (Cl. 99—169)

ABSTRACT OF THE DISCLOSURE

This process prepares fresh foods such as meat, seafood, poultry and the like, for their preservation. The process includes the coating of the food product with an aqueous algin dispersion containing a carbohydrate comprising at least one sugar selected from the group consisting of monosaccharides and disaccharides dissolved in water. The coated product is then subjected to an aqueous gelling solution containing an effective amount of water soluble source of calcium ion for a sufficient time period to firmly bond the coating to the food product but without imparting any bitter taste thereto.

BACKGROUND OF THE INVENTION

This application is a continuation-in-part of my earlier filed copending application Ser. No. 370,335, filed May 26, 1964, which is now abandoned.

Large quantities of meat, seafood, poultry, and the like, are marketed annually for human consumption. Such foods, however, have a relatively short refrigerated storage or shelf life, three or four days at the most. Once the animal has been killed, microorganisms and enzymes attack the food product and cause rapid deterioration, decay and eventually spoilage.

The retention of quantity in fresh foods is of tremendous economic value to the food industry and the individual consumer. A substantial benefit would result if the storage or shelf life of fresh foods could be extended even by so much as a few days. Many attempts have been made to provide a cheap, safe and practical process for preserving uncooked foods. For example, it has been suggested that spoilage of such food products can be partially prevented and its storage or shelf life extended by special packaging and/or special freezing or quick freezing techniques and, while these methods of preservation have been found to aid somewhat in inhibiting deterioraton, they are not altogether satisfactory. Frozen foods, such as meat, seafood, poultry and the like, are decidedly inferior to the fresh product. Frozen shrimp, for example, when stored for even a period of a few weeks loses the characteristic pink and white color of the fresh product and, in addition, becomes corky and tough.

Various coatings have also been applied to food products, such as meat, seafood, poultry and the like, to prevent deterioration. Such coatings have not found commercial acceptance or usage for one or more reasons. When edible coating materials have been used they have given an undesirable taste to the cooked food. Such prior art coatings also do not uniformly adhere to the food product to which they are applied, they crack and spall during storage, handling, etc.

Clear coating materials using mainly corn carbohydrates and algin have been suggested for increasing storage life, preserving quality and reducing moisture loss, but to date the use of such materials also has not found acceptance in the trade. While such coating materials improved texture and juiciness, and in some cases color, appearance, surface texture and odor over the uncoated product, flavor is decidedly inferior for the coated product. This is due to the bitter flavor imparted by the calcium gelling solution used to convert the starch solution to a plastic-like coating.

It has also been suggested that food products, such as seafood, can be preserved by dipping the seafood in a coating comprising an edible starch and a water-soluble gum, solidifying the coating to the seafood and then freezing, all as shown in pending patent application Ser. No. 283,674, now Patent No. 3,255,021. While such a process has advantages over freezing alone, it too has certain disadvantages. Before this method can be used, it is first necessary to destroy the microorganisms and enzymes. Furthermore, it is necessary to freeze the seafood after the coating has been applied and gelled. Also, the preparation of the aqueous dispersion solution necessitates careful compounding at elevated temperatures, requiring the services of a skilled operator.

Notwithstanding the considerable amount of research that has been conducted to develop an economical and practical process to preserve foods, such as meat, seafood, poultry and the like, none have to date proven commercially acceptable.

SUMMARY OF THE INVENTION

It is, therefore, an object of the present invention to provide an edible coating for meats, seafood, poultry and the like, which will extend the storage or shelf life of such foods.

It is a further object of the invention to extend the storage or shelf life of meats, seafood, poultry and the like, by coating such products with an edible coating material which need not be removed prior to cooking or eating and which gives the cooked product an attractive, pleasing and appetizing appearance.

It is a further object of the invention to coat meat, seafood, poultry and the like with an edible coating substance which is odorless, colorless, tasteless and which becomes physically attached thereto.

It is a further object of the invention to provide a simple and economical process for applying an edible coating to seafood products, such as meat, seafood, poultry and the like, which will extend and increase the uncooked storage or shelf life of such foods.

It is a further object of the invention to provide a commercially acceptable process for preserving meats, seafood, poultry and the like, by coating such products with an edible coating which is free from any objectionable taste or odor when cooked.

It is a further object of the invention to improve the quality characteristics of meat, seafood, poultry and the like, by coating such products with an odorless, colorless and tasteless substance.

It is a further object of the invention to extend the storage or shelf life of fresh meats, seafood, poultry and the like, without the necessity of having to first kill the microorganisms and enzymes.

These and other objects and advantages will become readily apparent to those skilled in the art from a further reading of the specification.

The process generally comprises immersing the prepared food product into an aqueous dispersion containing water soluble algin and a carbohydrate comprising mono and/or disaccharide sugar (preferably dextrose), preferably at room temperature, removing the coated food product from the aqueous dispersion and allowing the excess to drain therefrom, dipping the coated food product into a water soluble source of calcium ion gelling agent for bonding the algin-sugar coating to the food product for a period of time long enough to firmly bond the aqueous dispersion to the food product, but without imparting a bitter taste thereto, removing the coated food product from the water soluble calcium containing gelling agent, and allowing any excess to drain therefrom. As indicated in the objects of this invention the process of my invention requires no treatment of the food prior to its coating to destroy microorganisms or enzymes.

The coating so produced is strong and can be handled within a period of thirty seconds after gelling without fear of cracking, spalling or rupture. The coating so produced becomes physically a part of the food to which it is applied, is odorless, colorless, and tasteless and can be eaten along with the food without notice.

DESCRIPTION OF SPECIFIC EMBODIMENTS

The coating composition for use in my invention can be prepared by adding separately water-soluble algin and a carbohydrate comprising mono and/or disaccharide sugar to pure drinking water. If desired the water-soluble algin and carbohydrate comprising mono and/or disaccharide simple sugars can be mixed together and added to pure drinking water. The latter method is preferred, when using dry powdered or granular sugar, since the dry sugar surrounds the very soluble alginate and prevents the alginate from forming undesirable fish eyes on addition to water.

Suitable carbohydrate mono and disaccharide sugars include sucrose, lactose, fructose, arabinose, maltose, dextrose, galactose, xylose, etc. Of these dextrose, particularly dry forms of dextrose wherein the dextrose comprises at least 75% by weight of carbohydrate solids on a dry basis, is preferred. Dextrose is preferred because of (A) its relatively low sweetness level which reduces the possibility of the coated food acquiring an undesirable sweetness, (B) the fact that it is monosaccharide not susceptible of further enzymatic degradation to another low sugar, (C) is availability, and (D) its inexpensiveness.

Suitable dry forms of dextrose include crystalline alpha dextrose hydrate, anhydrous dextrose, high dextrose content dried syrup (known as dextrose and corn syrup solids), the so-called chip sugar, having about 80% dextrose.

Liquid corn syrups of high, intermediate and low dextrose content can also be employed as the source of mono and/or disaccharide sugar. For example various high dextrose syrups containing from about 75 to 98% dextrose are available. Intermediate and low dextrose corn syrups are less desirable than the high dextrose syrups since they do not give the same degree of preservation to the coated food product as do the high dextrose materials, since they are more susceptible to enzyme degradation. In general the liquid corn syrups are diluted with water prior to mixing with algin or added to aqueous dispersion to algin. If undiluted corn syrups having about 70% dry solids is mixed directly with algin, a gummy mass results due to absorption by the algin of the water in the corn syrup.

Any water soluble algin that will gel with calcium salts, such as sodium or potassium and ammonium salts of alginic acid, may be satisfactorily used. Sodium alginate in its less degraded form, namely the high viscosity grades, is preferred.

The food coating dispersion utilized in my invention contains from about two and one-half to twenty parts by dry weight of water-soluble algin to about 97.5 to 80 parts by dry weight of carbohydrate comprising mono and/or disaccharide sugars, preferably dextrose. In the preferred method of operation algin and dry dextrose powders are well mixed together in the dry state. This mixture is then dissolved in a sufficient quantity of pure drinking water to produce an aqueous dispersion having a viscosity of between 50 and 5000 centipoises, depending upon the food product to be coated. If the viscosity of the aqueous dispersion is too low, the coating on the food product will be too thin and weak and will not withstand the conditions normally encountered in storage and handling. If, on the other hand, the viscosity is too high, the resulting coating will be too thick and gummy, representing a waste of valuable product without producing any beneficial effects. In addition, one eating the food so coated becomes aware of the coating substance, which otherwise would not be noticeable had the food been coated using a dispersion solution coming within the viscosity ranges herein specified.

It has been found that for practical purposes an aqueous dispersion falling within the range of 5 to 15 parts of soluble algin to 95 to 85 parts of dextrose having a viscosity range of between 150 and 4000 centipoises are preferred. For viscosity below the above stated lower limit, the coating, while usable, is thin and for most applications lacks strength and toughness. For viscosity above the upper limit, the coating becomes uneconomical and wasteful and under some conditions produces awareness of the existence of the dispersion solution on the cooked food product. The preferred coating substance is obtained by dry mixing 50 parts of high viscosity sodium alginate (Kelco-gel HV) with 450 parts of dextrose monohydrate. Ten parts by weight of the foregoing mixture is then dissolved in 90 parts by weight of pure drinking water at room temperature. The mixture has a viscosity of approximately 400–500 centipoises at 20° C.

After the food product has been immersed, coated and removed from the aqueous dispersion any excess dispersion is permitted to drain therefrom. The coated food product is then immersed in an aqueous gelling solution containing a water-soluble source of calcium ions, such as, calcium chloride, calcium gluconate, calcium acetate, calcium propionate, calcium lactate, etc. Both steps of the process are preferably carried out at room temperature. The food product should remain in the gelling solution for a period of time sufficient to form a film strong enough to prevent cracking or breaking during subsequent handling, but not so long as to cause bitterness in the product.

In general the retention time in the aqueous gelling solution depends upon the concentration of the calcium in the solution. The stronger the solution, the less retention time required. For example, we have found that a firm gel can be produced using 0.5 molar solution of calcium chloride with a retention time of 30 seconds. No bitter taste results and the film is strong enough to be handled without cracking or breaking within 30 seconds time. Care must be exercised in using more concentrated calcium ion gelling solution since the higher the concentration of calcium the greater the probability of imparting a bitter taste to the treated food.

In many commercial operations a gelling time of 30 seconds is considered too time consuming to permit the use of this process while the use of more concentrated calcium ion gelling solutions requires too much care for routine operation (i.e. skilled operators and timing apparatus). It has been found that the gelling time can be greatly reduced by adding an edible gum or gum-like thickening agent to the calcium ion gelling bath in sufficient quantities to give the gelling composition a Brookfield viscosity of between 5 and 250 centipoises, preferably 5 to 100 centipoises, at room temperature. A firm strong film is formed without imparting bitterness to the food almost instantaneously on dipping algin-dextrose coated food into the bath. Using the preferred concentration of thickener, the time of immersion is not critical, the product remaining in solution less than five seconds. However, as the viscosity of the gelling composition increases the possibility of imparting bitterness to the treated food increases.

Any gum or gum-like thickening agent which is edible and which will not be precipitated by calcium ions can be used as the thickening agent. The edible gum for purpose of this invention comprises at least one member selected from the group consisting of plant gums, dextran, alkali metal salt or carboxymethyl cellulose and cellulose ethers. Sodium carboxymethyl cellulose (Hercules Powder 7–MP) is one such substance. Concentrations of sodium carboxymethyl cellulose of between 0.75% and 1.25% by weight are preferred, although other concentrations between the range of 0.25% and 2.50% can also be used. Bichemical gums in concentrations of about 0.1% to 0.5% can also be used. Other edible gums include Klucal HW (propylene glycol ester of carboxymethyl cellulose), methyl cellulose and gum karaya.

After the food product is removed from the aqueous gelling solution (either containing a gum thickener or not) any excess remaining thereon is allowed to drain therefrom. No further processing is necessary. The coated food product is then ready for display, storage, breading, freezing, irradiation, cooking, etc. As indicated above the storage life of foods treated in the above manner is lengthened. Further, the protective coating tends to improve the quality of the coated food, since the coating retards evaporation of the natural moisture during the cooking operation. Flavor is also enhanced since the coating surrounding the food holds, or retains the delicate, volatile flavors of the food which are normally "blasted off" during cooking.

It has been noted that in the cooking of certain foods coated in the manner described above that a dark brown color results, which may be considered by some to be aesthetically unappetizing, notwithstanding the fact that flavor is greatly improved as compared with the uncoated product. This phenomenon, which I have called "browning" can be overdone in either of two ways. The first method comprises adding an undissolved or unpasted edible amylaceous material to the algin-carbohydrate coating composition. For example, it has been found that equal parts of corn starch and dextrose will brown about one-half as much as the dextrose alone. Inasmuch as the amylaceous material is not dissolved or pasted, it does not greatly affect the viscosity of the coating composition or the film properties of the coating. The second method comprises dusting the food to be coated with cold water-insoluble edible amylaceous material prior to dipping the food in the algin-carbohydrate composition.

Suitable edible amylaceous materials include wheat flour, corn starch, potato starch, rice starch, corn flour, etc. The amylaceous materials can be modified, such as acid hydrolyzed or treated with alkaline hypochlorite, derivatized with monofunctional reagents, such as propylene oxide, vinyl acetate, vinyl propionate, acetic anhydride, etc. and/or with polyfunctional reagents, such as phosphorus oxychloride, epichlorohydrin, etc.

The above methods of controlling "browning" particularly the "dusting" technique has also been found to enhance the adhesion of the preservative coating composition (algin-dextrose layer, for example) to treated foods. In most cases this enhanced adhesion is not too important. However, in those cases where breading is applied to the coated food and the breaded food is deep fried, this enhanced adhesion is extremely important. In the absence of the "browning" control, there is a tendency for the preservative coating to separate from the coated food resulting in the breaded material flaking off or splitting. With "dusting" flaking and splitting is eliminated.

In some cases it is desirable to be able to remove the algin-carbohydrate coating of my invention from the food without changing or in any way damaging the food product. Removal of the coating, for example, is necessary where the coated product requires governmental inspection. In any such operation the net quantity of food so coated is an essential determination by the governmental inspector. Removal of the coating is also necessary for foods containing a breading material, so as to determine compliance with established standards of proportions of breading to net food content. Furthermore, the method of such removal must be simple, capable of being combined with established inspection procedures and cause no adverse effect on the product being inspected. The removal procedure described and claimed herein meets all of these requirements.

It is also desirable to remove the coating material from fresh or frozen foods whose identity as uncoated products should be preserved after cooking in water, such as boiling in a container at atmospheric pressure or in a pressure cooker, as compared to boiling, baking, or pan frying or deep fat frying. Such foods as shrimp for cocktail purposes and frozen vegetables, such as peas, green beans or corn, which have been coated prior to freezing, would fall within this category.

The removal agent may be the same for different foods, although the procedure for removing the coating may vary according to the food being inspected. In general the removal agents are water-soluble calcium sequestering agents.

There are a great number of sequestering agents suitable for purposes of my invention. Among the broad general types are aromatic and aliphatic amines, hydroxy acids, dicarboxylic acids, amino acids, condensed inorganic phosphates and certain phenolic compounds. The sequestering agent, which may include mixtures, should be one which itself will not impart any undesirable odor, flavor, and, preferably, color to the starch, and since the ultimate use of the products of my invention is for food purposes, the sequestering agent should be non-toxic. Condensed inorganic phosphates are peculiarly effective and the preferred sequestering agents for purposes of my invention. Condensed inorganic phosphates comprise that group of compounds usually prepared by heating primary of secondary orthophosphates to effect elimination of water and/or polymerization of the phosphate. The products include the following: metaphosphates, as sodium metaphosphate, $(NaPO_3)_3$; pyrophosphates, as tetrasodium pyrophosphate, $Na_4P_2O_7$ and sodium acid pyrophosphate, $Na_2H_2P_2O_7$; and the various polyphosphates such as sodium tripolyphosphate, $Na_5P_3O_{10}$, alkylenediaminepolyacetic acids salts such as the sodium salt ethylenediaminetetraacetic acid, the potassium salt of propylenediaminetetraacetic acid, sodium salt of ethylenediamine-di-(-orthohydroxyphenyl)-diacetic acid, sodium salt of ethylenediamine-di-(hydroxyethyl)-diacetic acid, etc.

For example, in the case of breaded seafood, such as breaded shrimp or breaded oysters which have been coated, breaded and frozen, sodium tripolyphosphate is the preferred calcium sequestering agent.

A concentration of ten grams of sodium triployphosphate per gallon of de-breading water is effective in removing the coating from the breaded shrimp or oysters. The sodium tripolyphosphate is added directly to the water, after which the coated food products is immersed therein. The de-breaded procedure is carried out in the manner normally employed in this industry. Repeated tests on coating removal in connection with de-breading indicates a final, de-coated and de-breaded product to be within 2% of the original known weight of the food before coating and breading.

The following examples are merely illustrative and should not be construed as limiting the scope of the invention.

Example I

Fifty parts of dry powdered Kelco-gel HV (high viscosity sodium alginate) was thoroughly mixed with 450 parts of dry granular dextrose monohydrate. Ten parts by weight of the above mixture was dissolved in 90 parts by weight of pure drinking water at room temperature. The resulting solution has a viscosity of between 400–500 centipoises at 24° C. Matching pieces of kingfish were cut into steaks from the same fish and one such steak was placed in a refrigerator. The other steak was totally immersed in the alginate-dextrose solution above referred to, then withdrawn and any excess thereon allowed to drain therefrom. The kingfish steak was then placed in an aqueous solution prepared by dissolving 27.5 grams of anhydrous calcium chloride in 489 cc. of pure drinking water and allowed to remain in the gelling solution for a period of thirty seconds. The steak was then removed and the excess gelling solution allowed to drain therefrom. The kingfish steak so coated was then placed in refrigerated storage alongside of the uncoated steak. After six days of refrigeration at 40° F. both the coated and the uncoated steaks were removed from refrigerated storage. The appearance of the uncoated steak after six days' storage in the refrigerator was much darker in color and the odor was much stronger than the coated steak. Both steaks were then cooked by broiling in the conventional manner in the oven of a domestic household electric range. The coated kingfish steak broiled to a pleasing brown color, while the uncoated steak was dark and dry in appearance. The taste of the coated kingfish steak after cooking was pleasantly moist and flavorful. Because of the spoiled odor of the uncooked steak after six days of refrigeration, no attempt was made to make a taste comparison.

Example II

Two samples of nearly identical pompano fillets were prepared in the manner described in Example I. After two days' storage in the refrigerator the fillets were inspected. The color of the uncoated sample was much darker and showed much more shrinkage than the coated sample. After pan frying on a household electric range much more shrinkage was evident in the uncoated sample than in the coated sample. The uncoated sample had a dried out appearance and was yellow looking as compared with the moist looking brownish colored coated sample. The coated fillet had a more moist and flavorful taste than the uncoated sample.

Example III

Samples of mackerel, mullet and yellowtail snapper were taken from opposite sides of the same fish and prepared in the manner described in Example I. After five days' storage in the refrigerator at 40° F. all samples were removed and broiled in a domestic household electric range. After cooking the coated specimens were in all instances found to be moist and flavorful and had an appealing golden brown color, as contrasted to the drier tasting uncoated controlled specimens, which broiled to a dry lusterless and dark, yellowish-brown appearance. Visual shrinkage appeared to be noticeably less in all of the coated cooked specimens, this being particularly so in the case of the yellowtail snapper, where considerable shinkage was observed in the uncoated specimen after broiling.

Example IV

Saratoga steaks of equal size and appearance were prepared in the manner described in Example I. After forty-eight hours in the refrigerator the samples were removed from storage and inspected. The uncoated sample was found to be drier and darker in color than the coated sample. After broiling the uncoated steak by inspection was much smaller than the coated sample and had a dried up appearance when compared with moist appearance of the coated steak. The uncoated cooked steak was drier tasting and tougher than the coated cooked steak.

Example V

Frozen yellowtail snapper fillets which previous to storage had been coated, using the method outlined in Example I, were examined and compared with frozen uncoated similar specimens of the same fish after six weeks' frozen storage. The coated samples had retained all of the quality judging attributes ordinarily found in commercial fresh fish, whereas the uncoated product had developed off odors which would have eliminated it from use in commercial channels.

Example VI

Two samples of nearly identical hamburger patties were selected for testing. One of the samples was placed in refrigeration. The other sample was coated in accordance with the method specified in Example I. After coating, the hamburger patty was placed in refrigerator storage alongside of the uncoated sample. After five days' storage at 40° F. the hamburger patties were removed and examined. The color of both the coated and the uncoated hamburger patties was dark brown. However, on exposure to air for a period of about twelve hours, the color of the coated hamburger patty was restored to the characteristic red of fresh meat, while the uncoated patty remained a dark brown color.

Example VII

One gram of dry Kelco-gel HV (high viscosity sodium alginate) was thoroughly mixed with 99 grams of granular dextrose monohydrate. This mixture was dissolved in 100 cc. of pure drinking water. The resulting solution had a viscosity of 360 centipoises at 24° C. Although containing 50% solids, the film so produced was very weak and unsuitable for use as a coating.

Two and one-half grams of Kelco-gel HV was thoroughly mixed with 97½ grams of granular dextrose monohydrate. This dry mixture was dissolved in 300 cc. of pure drinking water. The resulting solution had a viscosity of 150 centipoises at 28° C. This film, while weak, could, however, be used to coat small pieces of food, such as shrimp, scallops, fish chips, etc.

Twenty grams of Kelco-gel HV was thoroughly mixed with eighty grams of granular dextrose monohydrate. Forty grams of this mixture was dissolved in 220 cc. of pure drinking water. The resulting solution had a viscosity of 6000 centipoises at 28° C. This mixture was found to be much too heavy and impractical for use as a coating material. Sixty-six cc. of additional pure drinking water was added to the mixture and the resulting viscosity was in the neighborhood of 4000 to 5000 centipoises at 28° C. This solution, while still much too heavy for ordinary use, could be used as a coating material for large and heavy pieces of meat, whole fish, whole turkeys, etc., where extremely high strength is required. A quantity of this aqueous dispersion material was placed in a conventional air spraygun and samples of yellowtail snapper were successfully sprayed. The dispersion material when sprayed did not seriously run and after gelling with calcium chloride produced an extremely strong film. Yellowtail snapper was also immersed in this high viscosity dispersion, allowed to drain and then immersed in calcium chloride for a period of thirty seconds. The film was found to be very strong, but extremely thick, and imparted to the cooked product an awareness of the existence of the dispersion solution on the cooked food product. In this example the net weight of the yellowtail fillet before coating was 83.5 grams and the net weight of the coated fillet was 101.5 grams, thus producing a coating of 18 grams, or an increase in weight of 21½%. It has been found that best results are obtained when the weight increase is in the neighborhood of about 10% for small food products such as shrimp, scallops, etc., and down to about 5% for larger food products such as steaks, chicken parts, whole fish, etc.

Example VIII

It has been found that certain meat tenderizing enzymes can be added to the aqueous dispersion solution, coated on the food product, gelled in the manner herein disclosed and when cooked produce a more tender and more flavorful product than the coated product without the use of tenderizer. The following examples illustrate the use of tenderizers incorporated in the aqueous dispersion solution. Beef ribeye steaks of similar size, shape and weight were selected and processed in the following manner. One sample was left uncoated and placed in refrigerated storage, one sample was coated in accordance with the method described in Example I, the other sample was also coated in accordance with the method shown in Example I, except that there was added to 400 cc. of the dispersion solution 25 grams of Adolph's Instant Meat Tenderizer seasoned with spices and 10 grams of Accent (monosodium glutamate). The coated samples were placed in refrigerated storage alongside of the uncoated sample. After twelve days at minus 10° C. all steaks were removed from refrigerated storage and inspected. The appearance, color and odor of the coated steaks was good and superior in all respects to the uncoated steak sample. After broiling in the conventional manner the coated sample containing the tenderizer and monosodium glutamate was found more tender and more flavorful than the other coated steak sample. Both coated samples were found to be superior in quality and flavor to the uncoated sample, which was off color, dry and tough.

Essentially the same results were obtained using Le Gout No. 20 Instant Tenderizer in place of the Adolph's Tenderizer. The composition of Adolph's Instant Meat Tenderizer comprises salt, spices, sugar, tricalcium phosphate, and vegetable enzyme of the papaya. The composition of Le Gout Four Purpose Tenderizer comprises water, sugar, monosodium glutamate, starch, vegetable enzyme, and flavoring.

Example IX

This invention also contemplates the coating of meats, seafoods, poultry and the like, by spraying the coating thereon as well as dipping, immersing, etc. For example, the dispersion prepared in accordance with the disclosure shown in Example I was placed in a conventional air spraygun connected to forty-five pounds per square inch air pressure. Yellowtail snapper and ribeye beef steaks were sprayed and thereafter dipped in a calcium chloride solution. The resulting coating was found to be of satisfactory strength and toughness. There was, however, a tendency for the coating to drip during the spraying operation.

The following dispersion solution was found to be more practical where the coating is to be sprayed rather than dipped: 15 grams of Kelco-gel HV dry weight mixed thoroughly with 85 grams of granular dextrose. Fifteen grams of this mixture was added to 85 cc. of pure drinking water. The resulting dispersion had a viscosity of 3800 centipoises at 24° C.

Example X

The following table shows a comparison of weight loss for coated and uncoated food products. The coated products were processed in accordance with the procedure outlined in Example I. All products were frozen and kept refrigerated for a period of seven days. The products were then removed from refrigerated storage and allowed to thaw at room temperature for a period of twelve hours and then weighed.

| Coated or uncoated | Net weight (g.) | Wgt. of coating added (g.) | Gross weight, before freezing (g.) | Final weight, after thawing (g.) | Moisture loss (g.) | Moisture loss (percent) |
|---|---|---|---|---|---|---|
| Ribeye beef steak uncoated | 236.5 | | 236.5 | 219.4 | 17.1 | 9.3 |
| Ribeye beef steak coated | 268.5 | 24.56 | 293.06 | 266.3 | 2.2 | 0.85 |
| Chicken leg uncoated | 263.8 | | 263.8 | 245.2 | 18.6 | 7.06 |
| Chicken leg coated | 226.5 | 26.9 | 253.4 | 223.4 | 3.1 | 1.37 |
| Yellowtail snapper uncoated | 202.2 | | 202.2 | 181.2 | 21.0 | 10.04 |
| Yellowtail snapper coated | 211.6 | 20.8 | 232.4 | 202.3 | 9.3 | 4.4 |

Example XI

Shrimp, fish, oysters and chicken were all coated in accordance with the procedure outlined in Example I. These coated products were then subjected to gamma rays from cobalt 60 up to 1-megarad (one million rads). There was no change or breakdown of the coating using radiation intensities up to these limits. Such treatment extended the shelf and storage life of the coated product beyond that of the uncoated test samples.

Example XII

One pound of fresh shrimp was washed, cleaned and deveined. One-half of the amount of shrimp so prepared was battered and breaded, using commercially available batter and breading materials. The other one-half was dipped in the algin-dextrose bath utilized in Example I. The shrimp was then removed from the aqueous dispersion, allowing any excess material to drain therefrom. The shrimp so coated was then dipped in a 0.5 molar solution of anhydrous calcium chloride, to which had been added 1% by weight of sodium carboxymethyl cellulose, said solution having a viscosity of 50 centipoises at room temperature. The time of immersion in the thickened calcium chloride solution was about five seconds. The coated shrimp was then removed from the gelling solution and the excess allowed to drain therefrom. The film so produced was firm and tough. The coated shrimp was then battered and breaded, using commercially available batter and breading materials in the same manner as the uncoated shrimp. All of the shrimp was then cooked in a deep fat fryer at 375° F. for three minutes. The breaded uncoated shrimp was light in color and exhibited splitting along the vein area. The taste was good, but the shrimp was dry and tough. The coated shrimp was not as uniformly brown, was somewhat darker than the uncoated shrimp and exhibited some splitting along the vein area. However, the taste was excellent and the shrimp was tender and succulent, the flesh being very white.

Example XIII

This example illustrates the utilization of a number of thickeners in the calcium ion gelling bath. Stew beef was dipped into the algin-dextrose bath utilized in Example I, permitted to drain. The beef so coated was then dipped into a 0.5 molar solution of anhydrous calcium chloride, which contained a thickener as enumerated in the table below, for about 5 seconds.

The coated stew beef was then removed from the gelling solution, permitted to drain and placed in a refrigerator.

| Thickener | Percent by weight of bath which was thickener | Brookfield viscosity in cps. using a No. 1 spindle at 20 r.p.m. |
|---|---|---|
| Sodium salt of carboxymethyl cellulose. | 0.35 | 10 |
|  | 0.7 | 20 |
|  | 1.0 | 58 |
| Bacterial dextran (Kelzan) | 0.025 | 12 |
|  | 0.05 | 20 |
|  | 0.10 | 48 |
| Methocel | 0.15 | 8 |
|  | 0.3 | 13 |
|  | 0.4 | 48 |
| Carrageenin | 0.1 | 8 |
|  | 0.5 | 60 |
| Gum Tragacanth | 0.1 | 9 |
|  | 0.3 | 18 |
|  | 0.5 | 28 |
| Guar Gum | 0.1 | 10 |
|  | 0.2 | 22 |
|  | 0.3 | 50 |

After aging three days in the refrigerator all of the coatings were intact and adhered tenaciously to the stew beef.

Example XIV

This example illustrates the enhanced results obtained on fresh shrimp utilizing the dusting technique of my invention with deep fried fresh shrimp. The coatings were prepared in the manner described in Example XII, battered and breaded, using standard commercial procedures. A control was also run which was not dusted or coated with the algin-dextrose composition of this invention. The results are set forth in the table below:

| Dusting Material | Color | Adherence | Condition of cooked product |
|---|---|---|---|
| Control | Good | Good | Dry, poor flavor. |
| Corn starch dust | do | Excellent | Moist, succulent. |
| Wheat flour | do | Good | Do. |
| Cold water soluble corn dextrose. | Fair | Poor | Do. |
| Golden dip batter (commercial batter). | do | do | Do. |

The same good adhesion, good color and moist, succulent taste was obtained when frozen shrimp was dusted with (A) corn starch, (B) a cross-linked corn starch acetate, (C) potato starch, (D) rice starch, (E) corn flour, and (F) wheat flour, dipped into the algin-dextrose bath of Example I, gelled in 0.5 molar calcium chloride bath thickened with sodium carboxymethylcellulose (10 to 15 cps.) for 5 seconds, lightly breaded and deep fat-fried for 3 minutes at 375° F. The predusted coated shrimp were more succulent and sweet than the uncoated control.

Example XV

Four pork chops of substantially the same size and appearance were selected for testing. One of the pork chops was used as a control. The other three pork chops were coated, using the materials prepared in accordance with that shown in Example I. An aqueous gelling solution prepared by dissolving 27.5 grams of anhydrous calcium chloride in 489 cc. of pure drinking water was prepared. This gelling solution was divided into three parts and to one part was added 0.25% of bacterial dextran, to another was added 0.75% of sodium carboxymethyl cellulose and to the remaining part 0.5% gum karaya was added. All gelling solutions had a viscosity of twenty centipoises at room temperature. One of the coated pork chops was dipped in the thickened gelling solution containing the Kelzan, another was dipped in the gelling solution containing the sodium carboxymethyl cellulose and the other pork chop was dipped in the gelling solution containing the gum karaya. The time of immersion was about five seconds for each coated pork chop, after which period the pork chop was removed and allowed to drain. The film produced in each instance was strong and tough, and the coated product could be handled without damage or rupture to the film almost immediately after its withdrawal from the gelling solution. All pork chops were then placed in a refrigerator at 36° F. for three days and then removed and cooked by frying. The uncoated pork chop had an odor which was so strong that it could not be tasted. The three coated pork chops all had a good color and appearance, were moist and tasty and there was no odor. Furthermore, there was no bitterness of calcium chloride taste with the cooked coated pork chops.

Essentially the same results were obtained using chopped sirloin beef patties.

Example XVI

This example illustrates the removal of the gelled algin-carbohydrate composition comprising mono and disaccharide sugars with sodium tripolyphosphate. Fish fillets, which had been coated in the manner described in Example I and frozen were dipped into a 12½% by weight aqueous sodium tripolyphosphate bath for about five seconds. The fillets were removed and allowed to remain exposed to room temperature until the surface had thawed and the surface coating had become spongy and viscous. The fish was then rinsed with a fine spray of water on each side for about 10 seconds in order to remove the gelled coating. The results are set forth below.

| Weights | Trout fillets | | | | Yellowtail | |
|---|---|---|---|---|---|---|
|  | #1 | #2 | #3 | #4 | #5 | #6 |
| Weight before coating, g | 109.8 | 112.9 | 117.3 | 110.2 | 200.1 | 150.1 |
| Weight after coating, g | 120.3 | 122.7 | 132.4 | 118.0 | 212.7 | 165.4 |
| Percent coating added | 10.6 | 8.6 | 13.3 | 7.1 | 6.3 | 9.4 |
| Weight after dipping in NaTPP, surface thawing and rinsing, g | 112.8 | 115.9 | 119.8 | 111.7 | 205.1 | 156.9 |
| Percent gain or loss from original weight | ¹2.7 | ¹2.6 | ¹2.1 | ¹1.3 | ¹2.5 | ¹3.8 |

¹ Percent gain.

The above table illustrates that preservative coating of my invention prevents frozen fish fillets from losing weight and in fact increases the weight of the fillets. In utilizing my removal process for frozen fish, the period of surface thawing may vary between a few minutes and thirty minutes, or longer, depending upon the temperature of the frozen fish, temperature of the room, the thickness of the fillet, etc. A rinsing period of from five to fifteen seconds for each side of the fillet is sufficient for washing away the solubilized coating ingredients. Prolonged rinsing is to be avoided to prevent removal of soluble material in the fish itself.

For the removal of the gelled coating from meat or poultry products, having a firmer structure than that of fish, the initial step of dipping the frozen product in a 12½% solution by weight of sodium tripolyphosphate is employed. As in the case of fish, the product is then left exposed to the air at room temperature. As the surface thaws it may be brushed prior to rinsing with a brush having bristles of medium stiffness in order to loosen the degraded coating material. When the coating appears to be loosened the product is rinsed under a gentle spray of water, with continued brushing.

Example XVII

This example illustrates a comparison of weight loss between peeled and deveined commercial shrimp, with and without a coating of this invention (dusted with corn starch, dipped in the algin-dextrose bath of Example I and gelled with .5 molar calcium chloride bath thickened with sodium carboxymethyl cellulose), which were double-breaded, frozen and debreaded in water (10 minutes) containing 0.5 oz. sodium tripolyphosphate per six quarts debreading water. The results are set forth in the table below:

| Weights and percentages | Control—double breaded—no coating | | With coating, double breaded | | |
|---|---|---|---|---|---|
| | Lot No. 1 | Lot No. 2 | Sample "A" | Sample "B" | Lot No. 2 |
| Original weight, g | 228.6 | 132.0 | 260.9 | 253.4 | 159.8 |
| Weight after coating, g | | | 292.8 | 285.6 | 174.5 |
| Percent coating added | | | 12.2 | 12.7 | 9.2 |
| Weight after breading, g | 435.5 | 258.2 | 486.0 | 473.9 | 298.1 |
| Percent breading (only) added | 90.5 | 95.7 | 74.0 | 74.0 | 77.5 |
| Coating and breading combined, added, percent | 90.5 | 95.7 | 86.2 | 86.7 | 86.7 |
| Weight after debreading, g | 221.3 | 128.9 | 263.6 | 256.8 | 155.2 |
| Percent gain or loss (from original weight) after debreading | [1] 3.2 | [1] 2.35 | [2] 1.3 | [2] 1.3 | [1] 2.88 |
| | Average 2.77% loss | | Average 0.09% loss | | |

[1] Percent loss.  [2] Percent gain.

As is seen from the numerous examples given herein, my invention provides a coating which becomes physically a part of the food to which it is applied and which can be eaten with the food without notice. The coating greatly retards oxidative degradation of the food, improves texture by reducing moisture loss and greatly reduces the loss of flavor particularly the volatile flavors. Contrary to normal expectation, it has been discovered that the effectiveness of the coating herein described and claimed is far greater than that which would result from a study of the film properties of such coating for a given thickness. This is believed to be for the reason that the surfaces of the food product which are being coated are extremely rough and offer a large surface area for attack by oxygen and enzymes produced by aerobic balance, as well as moisture loss. The coating fills in all of the surface irregularities, that is, the cracks and crevices, and produces a smooth film on the surface of the product, thereby tremendously reducing the surface area exposed to the aforementioned degradative factors.

The protective coating also tends to improve the cooking qualities of the food by retarding the evaporation of the moisture during frying, broiling or baking, the coating tending to retain moisture during the cooking process; also, the surface of the coating when cooked turns brown, giving an attractive, pleasing and appetizing appearance to the cooked product.

When meat, seafood, poultry and the like, are breaded and frozen there is a tendency on thawing out for the moisture in the protein to transfer into the breading, thus causing sogginess in the breading, which makes it difficult to maintain high quality standards. In food products coated as herein described the moisture is retained within the product and not permitted to escape through the coating. High grade breaded products are now made possible for the first time.

When prepared in accordance with the disclosures herein contained the coating is clear and transparent, it fills in the deep crevices and imperfections of the food to which it is applied and it enhances the appearance of the food prior to cooking. It greatly reduces the surface area of the food without shrinkage of the flesh and thereby reduces to some extent the ability of the oxygen and the aerobic bacterial enzymes to degrade the food.

Another unexpected benefit obtained from the use of the coating was the greatly improved quality of cooked food. When food is coated with the dispersion and under the method herein proposed the coating acts as a "pressure cooker" during the cooking. The coating holds in or retains a great deal of the moisture, as well as the delicate volatile flavors contained in the food, which would otherwise be "blasted off" during cooking. The retention of these volatile flavors was not anticipated. In every case, the coated cooked food products retained their natural superior flavor, whereas the natural flavor was lost during the cooking of the uncooked sample, such being the case even if the foods were cooked immediately after coating with no storage life.

Foods protected with non-edible wrapping films having good moisture vapor transmission and oxygen barrier properties nevertheless failed to give comparable results, for once the films are removed moisture and volatile flavors are lost.

Foods coated by the process herein disclosed and subjected to gamma radiation do not develop off flavors and remain in excellent condition by whatever means of storage for a considerable longer period of time than do comparable uncoated food products without irradiation.

Meat tenderizing enzymes can be added to our edible coatings and gelled on the surface of the protein to produce an excellent texture and tender product after cooking.

Our preferred edible coating deposits approximately 10% wet weight on small food products such as shrimp, scallops, etc., whereas larger surface areas, such as steak, chicken legs, whole fish, etc., the wet weight added is as low as 5%. The percentage deposited may be varied with the viscosity of the coating. Our preferred wet weight is between 5% and 10%.

It is not intended to limit the invention herein disclosed to dipping or immersing the coated food product in the gelling solution. Spraying of the gelling solution on the coated product is contemplated by this disclosure. While calcium chloride is the preferred gelling agent because of its cheapness, strength of gel and speed of action, calcium gluconate may also be used without producing a bitter taste to the coated cooking product. Such film, however, is much weaker than the film produced from calcium chloride and the cost of this salt is more expensive.

It may under some conditions be desirable to market a prepackaged aqueous dispersion solution for use by stores, meat markets, seafood counters, etc. Such product could be produced in accordance with the disclosure contained herein, placed in cans and pasteurized or sterilized prior to its sale. Such product can be subject to considerable heat without too great a degradation in its viscosity. In the event the dispersion solution is to be heated for pasteurization it will be necessary to use a composition having a higher solids content to offset the heat degradation. Sterilization of such product could also be accomplished at room temperature by irradiation.

Since many embodiments of this invention may be made and since many changes may be made in the embodiments described, the foregoing is to be interpreted as illustrative, and my invention is defined by the claims appended hereafter.

I claim:
1. A method of preserving foods such as meat, seafood, poultry which comprises coating the food product with an aqueous algin dispersion which comprises on a dry weight basis from about 2.5 parts to 20 parts of a water soluble algin to about 97.5 to 80 parts of a carbohydrate comprising at least one sugar selected from the group consisting of monosaccharides and disaccharides dissolved in pure drinking water, said aqueous dispersion having a viscosity at room temperature of between 50 and 5000 centipoises, and subjecting the food so coated to an aqueous gelling solution containing a water soluble source of an effective amount of calcium ion for a sufficient period of time to firmly gel the coating to the food product, but without imparting any bitter taste thereto.

2. The method of claim 1, wherein the sugar comprises dextrose.

3. The method of preserving foods such as meat, seafood, poultry, which comprises dusting the food to be preserved with an edible amylaceous material having a high cold-water insoluble starch content, coating the food product with an aqueous algin dispersion which comprises on a dry weight basis from about 2.5 to 20 parts of a water soluble algin to about 97.5 to 80 parts of a carbohydrate comprising at least one sugar selected from the group consisting of monosaccharide and disaccharides dissolved in pure drinking water, said aqueous dispersion having a viscosity at room temperature of between 50 and 500 centipoises, and subjecting the food so coated to an aqueous gelling solution containing a water soluble source of an effective amount of calcium ion for a sufficient period of time to firmly gel the coating to the food product, but without imparting any bitter taste thereto, the adhesion of the coating being further enhanced by said edible amylaceous material.

4. The method of preserving foods such as meats, seafoods, poultry which comprises coating the food product with an aqueous algin dispersion which comprises on a dry weight basis from about 2.5 to 20 parts of a water soluble algin to about 97.5 to 80 parts of a carbohydrate comprising at least one sugar selected from the group consisting of monosaccharides and disaccharides dissolved in pure drinking water, said aqueous dispersion having a viscosity at room temperature of between 50 and 5000 centipoises, and contacting the food so coated with an aqueous gelling solution containing an effective amount of water soluble calcium ion and an edible gum in a concentration sufficient to produce a viscosity of from 5 to 250 centipoises at room temperature and maintaining contact for a sufficient period of time to firmly gel the coating to the food product but without imparting any bitter taste thereto.

5. The method of claim 4 wherein said edible gum comprises at least one member selected from the group consisting of plant gums, dextran, alkali metal salt of carboxymethyl cellulose and cellulose ethers.

6. The method of preserving foods such as meats, seafoods, poultry which comprises immersing the food product in an aqueous algin dispersion which comprises on a dry weight basis a mixture of about 5 to 15 parts of water soluble algin to about 95 to 85 parts of dextrose dissolved in pure drinking water, said aqueous dispersion having a viscosity at room temperature between 150 and 4000 centipoises, removing the coated food product from the aqueous dispersion, allowing the excess to drain therefrom, and immersing the coated food product in an aqueous gelling solution containing an effective amount of anhydrous calcium chloride dissolved in pure drinking water for a period of time sufficiently long to gel the coating to the food product, but without imparting any bitter taste thereto.

7. The method of preserving food such as meats, seafoods, poultry which comprises coating the food product with an aqueous dispersion which contains on a dry weight basis from about 2.5 to 20 parts of water soluble algin to about 97.5 to 80 parts of dextrose dissolved in pure drinking water, said aqueous dispersion having a viscosity at room temperature in the range between 50 and 5000 centipoises, allowing any excess dispersion to drain therefrom, immersing the food product so coated in an aqueous gelling solution containing an effective amount of water soluble calcium chloride and an edible gum selected from the group consisting of plant gums, dextran, alkali metal salt of carboxymethyl cellulose and cellulose ethers in a concentration sufficient to produce a viscosity of from 5 to 250 centipoises at room temperature and maintaining the immersion for a period of time sufficient to firmly gel the coating to the food product, but without imparting any bitter taste thereto.

8. The method of preserving fresh foods such as meats, seafoods, poultry which comprises dusting the food to be preserved with an edible amylaceous material having a high cold water insoluble starch content, coating the food so dusted with an aqueous dispersion which contains on a dry weight basis from about 2.5 to 20 parts of water soluble algin to about 97.5 to 80 parts of dextrose dissolved in pure drinking water, said aqueous dispersion having a viscosity at room temperature in the range of between 50 and 5000 centipoises, allowing any excess dispersion to drain therefrom, immersing the food product so coated in an aqueous gelling solution containing a water soluble source of an effective amount of calcium ion and an edible gum selected from the group consisting of plant gums, dextran, alkali metal salt of carboxymethyl cellulose and cellulose ethers in a concentration sufficient to produce a viscosity of from 5 to 250 centipoises at room temperature and maintaining the immersion for a period of time sufficient to firmly gel the coating to the food product, but without imparting any bitter taste thereto, the adhesion of the coating being further enhanced by said edible amylaceous material.

9. The method of preserving fresh breaded foods such as meats, seafoods, poultry which comprises dusting the food to be preserved with an edible amylaceous material having a high cold water insoluble starch content, coating the food so dusted with an aqueous dispersion, containing on a dry basis from about 2.5 to 20 parts of a water soluble algin to about 97.5 to 80 parts of a carbohydrate comprising at least one sugar selected from the group consisting of monosaccharides and disaccharides dissolved in pure water, said aqueous dispersion having a viscosity at room temperature of between 50 and 5000 centipoises, subjecting the food so coated to an aqueous gelling solution containing a water soluble source of an effective amount of calcium ion for a sufficient period of time to firmly gel the coating to the food product, but without imparting any bitter taste thereto, the adhesion of the coating being further enhanced by said edible amylaceous material, dipping the coated food into a battering material and thereafter into a breading material so that the breading adheres to the coated food in a uniform layer.

References Cited

UNITED STATES PATENTS

| | | | |
|---|---|---|---|
| 1,902,773 | 3/1933 | Hale | 99—166 X |
| 2,806,797 | 9/1957 | Brasch et al. | |
| 3,255,021 | 6/1966 | Earle et al. | 99—195 |

HYMAN LORD, *Primary Examiner.*